United States Patent Office 3,660,425
Patented May 2, 1972

---

3,660,425
CERTAIN 5-AMINO-4-AROYLPYRAZOLES
Horace A. De Wald and Donald E. Butler, Ann Arbor, Mich., assignors to Parke, Davis & Company, Detroit, Mich.
No Drawing. Continuation-in-part of application Ser. No. 824,687, May 14, 1969. This application Mar. 30, 1970, Ser. No. 24,012
Int. Cl. C07d 49/20
U.S. Cl. 260—310 R
6 Claims

ABSTRACT OF THE DISCLOSURE 5-amino-4-arolypyrazole compounds, also substituted in the 1- and 3-position by lower alkyl groups, acid-addition salts thereof, and their production by (1) reacting a 4-aroyl-5-halopyrazole with ammonia or methylamine; (2) hydrolyzing a 4-aroyl-5-arylamidopyrazole; or (3) reacting a 5-amino-4-cyanopyrazole with an aryl organometallic compound. The compounds of the invention are useful as pharmacological agents that exert a depressant effect upon the central nervous system and as chemical intermediates.

CROSS REFERENCE TO RELATED APPLICATION

This application is a continuation-in-part of co-pending application Ser. No. 824,687, filed May 14, 1969, now U.S. Pat. 3,558,605.

SUMMARY AND DETAILED DESCRIPTION

The present invention relates to new heterocyclic amine compounds that are useful as pharmacological agents and to methods for their production. More particularly, the invention relates to new 5-amino-4-aroylpyrazole compounds having the formula

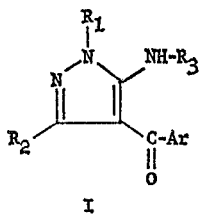

I and to pharmaceutically-acceptable salts thereof; where each of $R_1$ and $R_2$ is an alkyl group having not more than 4 carbon atoms, $R_3$ is hydrogen or methyl, and Ar is phenyl, fluorophenyl, chlorophenyl, bromophenyl, trifluoromethylphenyl, methoxyphenyl, tolyl, 2-chloro-3-methoxyphenyl, cyclohexyl, or 2-thienyl.

In accordance with the invention, 5-amino-4-aroylpyrazole compounds having Formula I above and salts thereof are produced by reacting a 4-aroyl-5-halopyrazole compound having the formula

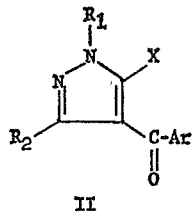

II with an amine compound having the formula $$R_3-NH_2$$

III where each of $R_1$, $R_2$, $R_3$, and Ar has the same meaning as given above, and X is halogen, preferably chlorine.

The reaction is advantageously carried out in an unreactive solvent medium. Suitable solvents include water; lower alkanols, such as methanol, ethanol, and 2-propanol; ethers, such as tetrahydrofuran, dioxane, and diethylene glycol dimethyl ether; tertiary amides, such as N,N-dimethylformamide and N-methyl-2-pyrrolidinone; acetonitrile; dimethylsulfoxide; and mixtures of these. When the amine reactant is ammonia, a preferred solvent is water; when methylamine is the reactant, a preferred solvent is 2-propanol. Neither the temperature nor the duration of the reaction is critical, and both may be varied over a wide range, the temperature from 50 to 200° C. and the duration from one to 48 hours. A preferred temperature is one between 75 and 160° C., and at such a temperature, the reaction is essentially complete after a period of about 5 to 18 hours, with the longer period being used at the lower temperature. When the amine reactant is ammonia, at elevated temperatures the reaction is best carried out in a sealed pressure vessel. To insure completeness of reaction, at least 2 moles of the amine reactant are required for each mole of 4-aroyl-5-halopyrazole. It is preferable to use a substantial excess of the amine reactant. The 5-amino-4-aroylpyrazole product may be isolated directly in free base form or in the form of an acid-addition salt, by appropriate adjustment of the pH.

The 4-aroyl-5-halopyrazole compounds required as starting materials in the foregoing process are prepared by one of two different methods. In the first method, a methyl alkynoate having the formula $$R_2-C\equiv C-CO_2H_3$$

IV is reacted with an alkyl hydrazine having the formula $$R_1-NHNH_2$$

V to give a 5-pyrazolone having the formula

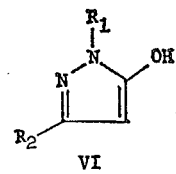

VI which in turn is reacted with a phosphorus oxyhalide to give a 5-halopyrazole having the formula

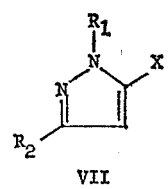

VII and the 5-halopyrazole intermediate finally is reacted with an aroyl chloride having the formula

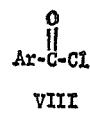

VIII in the presence of aluminum chloride to give the desired 4-aroyl-5-halopyrazole starting material; where each of $R_1$, $R_2$, Ar, and X has the same meaning as previously given.

In the second method, with is preferred for the preparation of the 4-aroyl-5-chloropyrazoles when Ar in Formula II is methoxyphenyl, 2-chloro-3-methoxyphenyl, cyclohexyl, or 2-thienyl, a 5-chloropyrazole having the formula

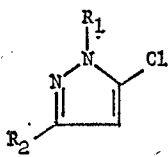

IX is reacted with bromine in acetic acid to give a 4-bromo-5-chloropyrazole having the formula

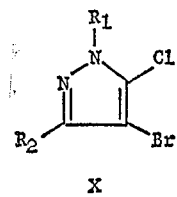

X which in turn is reacted with n-butyl lithium, and the resulting lithiated intermediate is reacted with an aroyl chloride having Formula VIII above, wherein Ar represents the groups indicated above, to give the desired 4-aroyl-5-chloropyrazole starting material.

Also in accordance with the invention, 5-amino-4-aroyl-pyrazole compounds having Formula I above and salts thereof are produced by reacting a 4-aroyl-5-arylamido-pyrazole compound having the formula

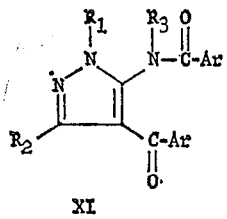

XI with a hydrolytic agent; where each of $R_1$, $R_2$, $R_3$ and Ar has the aforemention significance. Any of a number of alkaline or acidic hydrolytic agents that are normally employed for the hydrolysis of amides can be used. Especially suitable hydrolytic agents are aqueous solutions of the mineral acids, hydrobromic, hydriodic, and sulfuric acids. Of these, 48% hydrobromic acid is preferred. The reaction is best carried out in an unreactive solvent medium. Suitable solvents include water (in excess of the amount required for hydrolysis), lower alkanoic acids, such as acetic acid and propionic acid, and lower alkanols, such as methanol and ethanol. Preferred solvents are water and acetic acid. The temperature of the reaction may be varied from 70 to 200° C., with a temperature in the range of from 125 to 160° C. being preferred. At a temperature in the preferred range, the reaction is essentially complete after about 3–18 hours, although shorter or longer times may also satisfactorily be employed. For best results, a large excess of the hydrolytic agent is employed. The 5-amino-4-aroylpyrazole product may be isolated directly in free base form or in the form of an acid-addition salt, by appropriate adjustment of the pH.

The 4-aroyl-5-arylamidopyrazole starting materials are prepared according to the following methods. A 3-oxo-alkanonitrile having the formula

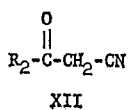

XII is reacted with an alkyl hydrazine having Formula V above in the presence of a strong acid to give a 5-amino-pyrazole having the formula

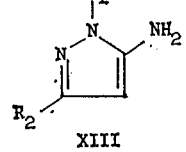

XIII which is then reacted with two molecular equivalents of an aroyl chloride having Formula VIII above in the presence of aluminum chloride to give a 4-aroyl-5-aryl-amidopyrazole starting material having the formula

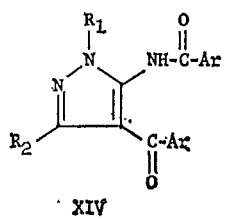

XIV

The starting materials of Formula XI wherein $R_3$ is methyl are then prepared by reacting a 4-aroyl-5-aryl-amidopyrazole of Formula XIV with a methylating agent, such as methyl iodide, in the presence of a base, such as sodium hydride.

Further in accordance with the invention, 5-amino-4-aroylpyrazole compounds having the formula

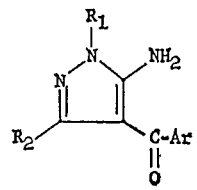

XV and salts thereof are produced by reacting a 5-amino-4-cyanopyrazole compound having the formula

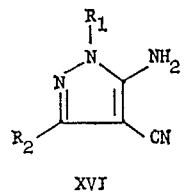

XVI with an aryl organometallic compound having the formula

Ar—M

XVII in an anhydrous, non-reactive solvent medium, and hydrolyzing the reaction product by treatment with an aqueous medium; where each of $R_1$, $R_2$, and Ar is as defined earlier, and M represents lithium or

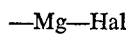

—Mg—Hal where Hal represents chlorine, bromine, or iodine, preferably bromine. Suitable solvents for the first stage of the process include ethers, such as diethyl ether, tetrahydrofuran, and diethylene glycol dimethyl ether; aromatic hydrocarbons, such as benzene and toluene; and mixtures of these. A preferred solvent is diethyl ether. The reaction can successfully be carried out over a wide range of temperatures, from 0 to 100° C. The preferred temperature is one in the range of from 25 to 60° C. or the reflux temperature of the reaction mixture. The duration of the reaction is likewise not critical; at the preferred temperature, the reaction is normally complete after a period of 12–20 hours. To insure completeness of reaction, at least 2 moles, and preferably more, of the aryl organometallic compound are used for each mole of the 5-amino-4-cyanopyrazole. Following completion of the first stage of the process, the reaction product is hyrolyzed by treatment with an aqueous medium, such as dilute aqueous inorganic acid or base. An acidic aqueous medium is preferred for hydrolysis. Following hydrolysis, the 5-amino-4-aroylpyrazole product may be isolated in free base or acid-addition salt form by suitable adjustment of the pH.

The 5-amino-4-cyanopyrazole starting materials are prepared by reacting an ethoxyalkylidenemalononitrile having the formula

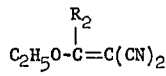

XVIII with an alkyl hydrazine having Formula V above; where $R_2$ has the same meaning as previously given.

The compounds of the invention can exist in the free base form having Formula I above or in the form of an acid-addition salt. Pharmaceutically-acceptable acid-addition salts are formed by reaction of the free base 5-amino-4-aroylpyrazole compounds with any of a number of inorganic acids, including hydrochloric, hydrobromic, hydriodic, nitric, sulfuric, and phosphoric, and with certain strong organic acids, such as methanesulfonic, benzenesulfonic, and p-toluenesulfonic. The free bases and salts may differ somewhat in certain physical properties, such as solubility in polar solvents, but they are otherwise equivalent for purposes of the invention.

The compounds of the invention can exist in anhydrous form as well as in solvated, including hydrated, forms. In general, the hydrated forms and the solvated forms with pharmaceutically-acceptable solvents are equivalent to the anhydrous or unsolvated form for the purposes of the invention.

The compounds of the invention are new chemical compounds that are useful as pharmacological agents and as chemical intermediates. As pharmacological agents, they exert a depressant effect upon the central nervous system that is shown by their ability to quiet laboratory animals and to prevent the occurrence of convulsions in such animals following the administration of pentamethylenetetrazole or following electroshock.

The quieting effect of the compounds of the invention is determined by the following test method. Graded doses of a test compound, dissolved or suspended in water, are administered by the intraperitoneal route to groups of 5 mice, and the animals are placed in cylindrical observation cages. The mice are then observed for 30 minutes for drug-induced changes in spontaneous motor activity and responsiveness to applied stimuli, such as noise, touch, restraint, and handling. Obvious reduction is spontaneous motor activity and moderate reduction in responsiveness are considered signs of quieting. Marked reduction in responsiveness to applied stimuli, between 15 and 30 minutes following administration of the test compound, is considered a sign of depression.

The results observed for some representative compounds of the present invention when tested by the foregoing procedure are shown in the following table, where the compounds are identified by reference to Formula I.

CENTRAL NERVOUS SYSTEM DEPRESSANT ACTIVITY

| Compound | | | | Dose, mg./kg. | Observed effect |
|---|---|---|---|---|---|
| $R_1$ | $R_2$ | $R_3$ | Ar | | |
| $CH_3$ | $C_2H_5$ | H | Phenyl* | 63 / 8 | Depression. / Quieting. |
| $CH_3$ | $CH_3$ | $CH_3$ | o-Fluorophenyl* | 8 / 4 | Depression. / Quieting. |
| $C_2H_5$ | $CH_3$ | H | o-Chlorophenyl* | 32 | Depression. |
| $n-C_3H_7$ | $CH_3$ | H | ......do...... | 8 / 2 | Depression. / Quieitng. |
| $n-C_4H_9$ | $CH_3$ | H | m-Chlorophenyl | 8 | Quieting. |
| $CH_3$ | $n-C_4H_9$ | H | o-Chlorophenyl | 16 | Quieting. |
| $CH_3$ | $CH_3$ | H | o-Bromophenyl** | 63 / 8 | Depression. / Quieting. |
| $n-C_3H_7$ | $CH_3$ | H | o-Trifluoromethyl phenyl**. | 8 / 2 | Depression. / Quieting. |
| $n-C_3H_7$ | $CH_3$ | H | o-Methoxyphenyl** | 8 / 4 | Depression. / Quieting. |
| $n-C_3H_7$ | $CH_3$ | H | o-Tolyl** | 16 / 2 | Depression. / Quieting. |
| $n-C_3H_7$ | $CH_3$ | H | 2-chloro-3-methoxyphenyl. | 16 / 2 | Depression. / Quieting. |
| $C_2H_5$ | $CH_3$ | H | Cyclohexyl** | 32 / 8 | Depression. / Quieting. |
| $CH_3$ | $CH_3$ | H | 2-thienyl** | 8 / 4 | Depression. / Quieting. |

*Administered as the monohydrochloride salt.
**Administered as the monohydrobromide salt.

The anticonvulsant activity of the compounds of the invention has been demonstrated and quantitatively determined in two different test methods. The first method, which measures the ability of a test compound to prevent the occurrence of convulsions in laboratory animals following the administration of pentamethylenetetrazole, is carried out essentially as described by Chen et al., A.M.A. Archives of Neurology and Psychiatry, vol. 66, pages 329–337 (1951), and vol. 68, pages 498–505 (1952), and by Chen et al., Journal of Pharmacology and Experimental Therapeutics, vol. 103, pages 54–61 (1951). The second method, which measures the ability of a test compound to prevent convulsions in animals subjected to electroshock, is a modification of a test described by Toman et al., J. Neurophysiology, vol. 9, pages 231–239 (1946).

The compounds of the invention can be administered orally or parenterally. They can be combined with either a solid or liquid carrier or diluent and made available in varying amounts in such pharmaceutical forms as tablets, capsules, powders, and aqueous and non-aqueous suspensions and solutions.

As chemical intermediates, compounds of the invention are used to prepare pyrazolo[4,3-e][1,4]diazepin-7(1H)-one compounds, having the formula

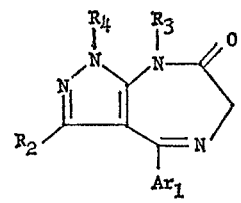

XIX where each of $R_2$ and $R_3$ has the same meaning as previously given, $R_4$ is methyl or ethyl, and $Ar_1$ is phenyl, o - fluorophenyl, or o - chlorophenyl. The pyrazolodiazepinone compounds of the above formula are useful as anticonvulsant and antianxiety agents and can be prepared from the appropriately substituted 5 - amino - 4 - aroylpyrazole compounds of the present invention, for example, by reacting one of the 5-amino - 4 - aroylpyrazoles with phthalimidoacetyl chloride to give a 4 - aroyl-5-(2-phthalimidoacetamido)pyrazole having the formula

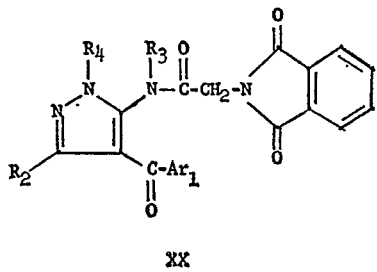

XX which is then reacted with hydrazine to give the desired pyrazolodiazepinone. In Formula XX, each of $R_2$, $R_3$, $R_4$, and $Ar_1$ is as defined earlier.

The invention illustrated by the following examples.

EXAMPLE 1

A mixture of 40 g. of 5-chloro-4-(o-chlorobenzoyl)-1,3-dimethylpyrazole and 120 ml. of 30% aqueous ammonia is heated in a closed pressure vessel at 155–160° C. for 5 hours, then cooled, and evaporated under reduced pressure. The residue is mixed well with a mixture of dichloromethane and dilute aqueous sodium hydroxide, and the dichloromethane phase is separated, washed with water, dried, and evaporated to give a solid residue of 5-amino - 4 - (o-chlorobenzoyl)-1,3-dimethylpyrazole; M.P. 102–103° C., following crystallization from benzene-cyclohexane. The monohydrochloride salt is prepared by dissolving the free base product in 2-propanol and treating the solution with an excess of 2-propanolic hydrogen chloride; M.P. 194–196° C., following crystallization from 2-propanol.

EXAMPLE 2

Utilizing the procedure described in Example 1 above, the following 5-amino-4-aroylpyrazole compounds are obtained from the reaction of the 4-aroyl-5-chloropyrazole compound designated below with ammonia. In each case, the molar ratio of the two reactants is approximately that employed in Example 1 above. The solvent given in parentheses following a melting point is the solvent used for crystallization.

(a) 5-amino-4-(o-fluorobenzoyl)-1,3-dimethylpyrazole, M.P. 108–109° C. (ethyl acetate-petroleum ether); from 5-chloro-4-(o-fluorobenzoyl)-1,3-dimethylpyrazole.

(b) 5 - amino-4-(o-bromobenzoyl)-1,3-dimethylpyrazole; from 5-chloro-4-(o-bromobenzoyl)-1,3-dimethylpyrazole. The monohydrobromide salt is prepared by dissolving the free base in excess 48% aqueous hydrobromic acid and evaporating the solution to dryness; M.P. 243–245° C., with decomposition (ethanol).

(c) 5 - amino-1,3-dimethyl-4-[(o-trifluoromethyl)benzoyl]pyrazole; from 5-chloro-1,3-dimethyl-4-[(o-trifluoromethyl)benzoyl]pyrazole. The monohydrobromide salt, M.P. 231–233° C., with decomposition (ethanol), is obtained as in (b) above.

(d) 5 - amino-1,3-dimethyl-4-[m-trifluoromethyl)benzoyl]pyrazole; from 5-chloro-1,3-dimethyl-4-[m-trifluoromethyl)-benzoyl]pyrazole. The monohydrobromide salt, M.P. 199–201° C., with decomposition (ethanol), is obtained as in (b) above.

(e) 5 - amino - 4 - (o-methoxybenzoyl)-1,3-dimethylpyrazole; from 5-chloro - 4 - (o-methoxybenzoyl)-1,3-dimethylpyrazole. The monohydrobromide salt, M.P. 224–226° C., with decomposition (ethanol), is obtained as in (b) above.

(f) 5-amino - 4 - (o-chlorobenzoyl)-3-ethyl-1-methylpyrazole (monohydrochloride salt, M.P. 170–172° C., following crystallization from 2-propanol); from 5-chloro-4-(o-chlorobenzoyl)-3-ethyl-1-methylpyrazole.

(g) 5 - amino-4-(o-chlorobenzoyl)-1-methyl-3-propylpyrazole, M.P. 108–110° C. (toluene); from 5-chloro-4-(o-chlorobenzoyl)-1-methyl-3-propylpyrazole.

(h) 5 - amino-4-(o-chlorobenzoyl)-3-isopropyl-1-methylpyrazole, B.P. 163–165° C./0.15 mm. Hg; from 5-chloro-4-(o-chlorobenzoyl) - 3 - isopropyl-1-methylpyrazole (i) 5-amino - 3 - butyl-4-(o-chlorobenzoyl)-1-methylpyrazole, M.P. 110–112° C. (toluene-petroleum ether); from 5-chloro - 3 - butyl-4-(o-chlorobenzoyl)-1-methylpyrazole.

(j) 5 - amino-4-(o-chlorobenzoyl)-1-ethyl-3-methylpyrazole (monohydrochloride salt, M.P. 166–168° C., following crystallization from 2-propanol); from 5-chloro-4-(o-chlorobenzoyl)-1-ethyl-3-methylpyrazole.

(k) 5 - amino-4-(o-methoxyphenyl)-3-methyl-1-propylpyrazole; from 5-chloro-4-(o-methoxyphenyl)-3-methyl-1-propylpyrazole. The monohydrobromide salt, M.P. 180–182° C. (ethanol), is obtained as in (b) above.

(l) 5 - amino-3-methyl-1-propyl-4-[(o-trifluoromethyl)-benzoyl]pyrazole; from 5-chloro - 3 - methyl-1-propyl-4-[(o-trifluoromethyl)benzoyl]pyrazole. The monohydrobromide salt, M.P. 206–208° C. (ethanol), is obtained as in (b) above.

(m) 5-amino - 4 - (2-chloro-3-methoxybenzoyl)1,3-dimethylpyrazole; from 5 - chloro-4-(2-chloro-3-methoxybenzoyl)-1,3-dimethylpyrazole. The monohydrobromide salt, M.P. 212–214° C. (ethanol), is obtained as in (b) above.

(n) 5 - amino-4-(o-chlorobenzoyl)-3-ethyl-1-propylpyrazole; from 5-chloro-4-(o-chlorobenzoyl) - 3 - ethyl-1-propylpyrazole. The monohydrobromide salt, M.P. 155–157° C. (ethanol), is obtained as in (b) above.

(o) 5-amino-1,3-dimethyl-4-(2-thenoyl)pyrazole; from 5-chloro-1,3-dimethyl-4-(2-thenoyl)pyrazole. The monohydrobromide salt, M.P. 185–187° C. (ethanol), is obtained as in (b) above.

(p) 5-amino - 4 - (cyclohexanecarbonyl) - 1 - ethyl-3-methylpyrazole; from 5-chloro-4-(cyclohexanecarbonyl)-1-ethyl-3-methylpyrazole. The monohydrobromide salt, M.P. 149–151° C. (ethanol), is obtained as in (b) above.

(q) 5-amino - 1,3 - dimethyl-4-(o-toluyl)pyrazole, B.P. 154–155° C./0.15 mm. Hg.; from 5-chloro-1,3-dimethyl-4-(o-toluyl)pyrazole.

(r) 5-amino - 4 - (2-chloro - 3 - methoxybenzoyl)-3-methyl-1-propylpyrazole, B.P. 198–200° C./0.2 mm. Hg; from 5-chloro-4-(2-chloro - 3 - methoxybenzoyl)-3-methyl-1-propylpyrazole.

EXAMPLE 3

(a) A mixture consisting of 25 g. of 5-chloro-4-(o-fluorobenzoyl) - 1,3 - dimethylpyrazole, 5 g. of methylamine, and 150 ml. of 2-propanol is heated at 75–80° C. for 18 hours and is then evaporated under reduced pressure. The residue obtained is extracted with 100 ml. of 1 N hydrochloric acid, and the acidic extract is made srongly alkaline with 50% aqueous sodium hydroxide. The solid precipitate of 4-(o-fluorobenzoyl)-1,3-dimethyl-5-(methylamino)pyrazole is isolated, dissolved in 2-propanol, and the solution is treated with an excess of dry hydrogen chloride. The solid 4-(o-fluorobenzoyl)-1,3-dimethyl - 5 - (methylamino)pyrazole monohydrochloride that precipitates is isolated and dried; M.P. 190° C., with decomposition, following crystallization from 2-propanol.

(b) Utilizing the procedure described in (a) above, from 24 g. of 4-benzoyl-5-chloro-1,3-dimethylpyrazole and 5 g. of methylamine, there is obtained 4-benzoyl-1,3-dimethyl-5-(methylamino)pyrazole; M.P. 83–85° C., following crystallization from ethyl acetate-petroleum ether. The monohydrobromide salt is obtained by dissolving the free base product in excess 48% aqueous hydrobromic acid and evaporating the solution to dryness under reduced pressure; M.P. 165° C., following crystallization from ethanol.

EXAMPLE 4

To a cooled suspension of 27 g. of anhydrous aluminum chloride in 200 ml. of sym-tetrachloroethane is added first 31 g. of o-fluorobenzoyl chloride and then 11 g. of 5-amino-1,3-dimethylpyrazole, and the resulting mixture is stirred and heated under reflux for 16 hours. Upon cooling, 100 ml. of cold, dilute hydrochloric acid is added, and the organic phase is separated, washed with saturated aqueous sodium bicarbonate, dried, and evaporated under reduced pressure to give a solid residue of 5-(o-fluorobenzamido) - 4 - (o-fluorobenzoyl)-1,3-dimethylpyrazole; M.P. 143–145° C., following crystallization from ethanol. A mixture consisting of 17.8 g. of this intermediate pyrazole, 120 ml. of glacial acetic acid, and 60 ml. of 48% hydrobromic acid is stirred and heated under reflux for 3 hours and then evaporated under reduced pressure. The residue obtained is dissolved in chloroform, and the resulting solution is stirred with excess saturated aqueous sodium bicarbonate. The organic phase is separated, dried, and evaporated under reduced pressure to give 5-amino-4-(o-fluorobenzoyl)-1,3-dimethylpyrazole; M.P. 108–109° C., following crystallization from ethyl acetate-petroleum ether.

EXAMPLE 5

Utilizing the procedure described in Example 4 above, the following 5-amino-4-aroylpyrazole compounds are obtained from the reactions indicated below. In each case, the molar ratios of the reactants are approximately those employed in Example 4. The solvent given in parentheses following a melting point is the solvent used for crystallization.

(a) 5 - amino - 3 - ethyl-4-(o-fluorobenzoyl)-1-methylpyrazole, M.P. 103–105° C. (ethyl acetate-petroleum ether); from the initial reaction of o-fluorobenzoyl chloride with 5-amino-3-ethyl-1-methylpyrazole in the presence of aluminum chloride to give 3-ethyl-5-(o-fluorobenzamido) - 4 - (o-fluorobenzoyl)-1-methylpyrazole, and the subsequent reaction of this intermediate with 48% hydrobromic acid in acetic acid.

(b) 5-amino - 3 - ethyl-4-(m-fluorobenzoyl)-1-methylpyrazole, M.P. 91–93° C. (ethyl acetate-petroleum ether); from the initial reaction of m-fluorobenzoyl chloride with 5-amino-3-ethyl-1-methlpyrazole in the presence of aluminum chloride, the subsequent reaction of the intermediate 3 - ethyl-5-(m-fluorobenzamido)-4-(m-fluorobenzoyl)-1-methylpyrazole with 48% hydrobromic acid in acetic acid.

(c) 5 - amino-4-(o - chlorobenzoyl)-3-methyl-1-propylpyrazole, B.P. 150–151° C./0.15 mm. Hg; from the initial reaction of 5 - amino - 3 - methyl-1-propylpyrazole with o-chlorobenzoyl chloride in the presence of aluminum chloride, and the subsequent reaction of the intermediate 5 - (o - chlorobenzamido)-4-(o-chlorobenzoyl)-3-methyl-1-propylpyrazole with 48% hydrobromic acid in acetic acid.

(d) 5 - amino-3-methyl-1-propyl-4-(o-toluyl)pyrazole; from the initial reaction of 5-amino-3-methyl-1-propylpyrazole with o-toluyl chloride in the presence of aluminum chloride, and the subsequent reaction of the intermediate 3-methyl-1-propyl-5-(o-toluylamido)-4-(o-toluyl)pyrazole with 48% hydrobromic acid in acetic acid. The monohydrobromide salt is prepared by dissolving the free base product in excess 48% hydrobromic acid and evaporating the solution to dryness; M.P. 201–203° C. (ethanol).

(e) 5 - amino-4-(o-bromobenzoyl)-3-methyl-1-propylpyrazole; from the initial reaction of 5-amino-3-methyl-1-propylpyrazole with o-bromobenzoyl chloride in the presence of aluminum chloride, and the subsequent reaction of the intermediate 5-(o-bromobenzamido)-4-(o-bromobenzoyl)-3-methyl-1-propylpyrazole with 48% hydrobromic acid in acetic acid. The monohydrobromide salt, M.P. 193–195° C. (ethanol), is obtained as in (d) above.

(f) 5 - amino-4-(p - chlorobenzoyl)-3-methyl-1-propyl- pyrazole; from the initial reaction of 5-amino-3-methyl-1-propylpyrazole with p-chlorobenzoyl chloride in the presence of aluminum chloride, and the subsequent reaction of the intermediate 5-(p-chlorobenzamido)-4-(p-chlorobenzoyl)-3-methyl-1-propylpyrazole with 48% hydrobromic acid in acetic acid. The monohydrobromide salt, M.P. 208–210° C. (ethanol), is obtained as in (d) above.

(g) 5 - amino-4-(o-chlorobenzoyl)-1-isopropyl-3-methylpyrazole; from the initial reaction of 5-amino-1-isopropyl-3-methylpyrazole with o-chlorobenzoyl chloride in the presence of aluminum chloride, and the subsequent reaction of the intermediate 5-(o-chlorobenzamido)-4-(o-chlorobenzoyl)-1-isopropyl-3-methylpyrazole with 48% hydrobromic acid in acetic acid. The monohydrobromide salt, M.P. 183–185° C. (ethanol), is obtained as in (d) above.

(h) 5-amino - 1 - butyl-4-(o-chlorobenzoyl)-3-methylpyrazole; from the initial reaction of 5-amino-1-butyl-3-methylpyrazole with o-chlorobenzoyl chloride in the presence of aluminum chloride, and the subsequent reaction of the intermediate 1-butyl-5-(o-chlorobenzamido)-4-(o-chlorobenzoyl)-3-methylpyrazole with 48% hydrobromic acid in acetic acid. The monohydrochloride salt is prepared by dissolving the free base product in 2-propanol and treating the solution with excess 2-propanolic hydrogen chloride; M.P. 145–147° C. (2-propanol).

(i) 5-amino-1-butyl-4-(m-chlorobenzoyl) - 3 - methylpyrazole, M.P. 128–130° C. (benzene-petroleum ether); from the initial reaction of 5-amino-1-butyl-3-methylpyrazole with m-chlorobenzoyl chloride in the presence of aluminum chloride, and the subsequent reaction of the intermediate 1 - butyl-5-(m-chlorobenzamido)-4-(m-chlorobenzoyl)-3-methylpyrazole with 48% hydrobromic acid in acetic acid.

EXAMPLE 6

To a suspension of 3.0 g. of a 50% sodium hydride in mineral oil dispersion in 100 ml. of N,N-dimethylformamide, cooled to 10° C., is added in portions 18 g. of 5-(o-fluorobenzamido)-4-(o-fluorobenzoyl) - 1,3-dimethylpyrazole, and the resulting mixture is stirred at 10° C. for 30 minutes. Methyl iodide (14 g.) is then added, and the reaction mixture is stirred at room temperature for 5 hours and evaporated under reduced pressure. The residue is extracted with dichloromethane, and the extract is washed with water, dried, and evaporated to dryness to give a solid residue of 4-(o-fluorobenzoyl)-1,3-dimethyl-5-(N-methyl-o-fluorobenzamido)pyrazole; M.P. 115–118° C., following crystallization from ethyl acetate-petroleum ether. A mixture of 37 g. of this intermediate pyrazole and 200 ml. of 48% hydrobromic acid is heated under reflux for 16 hours and then evaporated under reduced pressure. The residue obtained is partitioned between chloroform and 3 N aqueous sodium hydroxide, and the organic phase is separated, washed with water, dried, and evaporated under reduced pressure to give a residue of 4-(o-fluorobenzoyl)-1,3-dimethyl - 5 - (methylamino)pyrazole, which is isolated and dried. The free base product is dissolved in 2-propanol, the solution is treated with excess dry hydrogen chloride, and the solid 4-(o-fluorobenzoyl)-1,3-dimethyl-5-(methylamino)pyrazole monohydrochloride that precipitates is isolated and dried; M.P. 190° C. (with decomposition), following crystallization from 2-propanol.

EXAMPLE 7

(a) To a solution of phenyl lithium, prepared from 70 g. of bromobenzene and 5.6 g. of lithium in 400 ml. of ether, is added in portions 25 g. of 5-amino-4-cyano-1,3-dimethylpyrazole, and the resulting mixture is stirred and heated under reflux for 18 hours. Upon cooling, the reaction mixture is decomposed with 150 ml. of saturated aqueous ammonium chloride, and the organic phase is separated and extracted with 400 ml. of 1 N hydrochloric acid. To the acidic aqueous extract is added 20 ml. of concentrated hydrochloric acid, and the mixture obtained is heated at 80–90° C. for 10 minutes, cooled, and made strongly alkaline with 50% aqueous sodium hydroxide. The alkaline mixture is in turn extracted with chloroform, and the chloroform extract is washed with water, dried, and evaporated to give a solid residue of 5-amino-4-benzoyl-1,3-dimethylpyrazole; M.P. 147–150° C., following crystallization from benzene.

(b) Utilizing the procedure described in (a) above, from 15 g. of 5-amino-4-cyano-3-ethyl-1-methylpyrazole and a solution of phenyl lithium, prepared from 70 g. of bromobenzene and 5.6 g. of lithium in 300 ml. of ether, there is obtained 5-amino-4-benzoyl-3-ethyl-1-methylpyrazole; M.P. 100–102° C., following crystallization from ethyl acetate-petroleum ether. The monohydrochloride salt is prepared by dissolving the free base product in 2-propanol and treating the solution with excess 2-propanolic hydrogen chloride; M.P. 178–181° C., following crystallization from 2-propanol.

EXAMPLE 8

To a solution of o-chlorophenyl magnesium bromide, prepared from 9.4 g. of magnesium and 76 g. of o-bromochlorobenzene in 300 ml. of ether, kept in a nitrogen atmosphere, is added 2.4 g. of 5-amino-4-cyano-1,3-dimethylpyrazole, and the resulting mixture is stirred and heated under reflux for 16 hours. Upon cooling, the reaction mixture is decomposed with 150 ml. of saturated aqueous ammonium chloride, and the organic phase is separated, washed with saturated aqueous sodium chloride, and extracted with 400 ml. of 1 N hydrochloric acid. To the acidic extract is added 30 ml. of concentrated hydrochloric acid, and the mixture obtained is heated at 80–90° C. for 10 minutes, cooled, and made strongly alkaline with 50% aqueous sodium hydroxide. The alkaline mixture in turn is extracted with chloroform, and the chloroform extract is washed with water, dried, and evaporated to give a solid residue of 5-amino-4-(o-chlorobenzoyl)-1,3- dimethylpyrazole; M.P. 102–103° C., following crystallization from benzene-cyclohexane. The monohydrochloride salt, M.P. 194–196° C., following crystallization from 2-propanol, is obtained by the procedure described in Example 7(b) above.

STARTING MATERIALS

The various starting materials employed in the foregoing examples and intermediates required for their preparation are obtained by the methods described in the following. The solvent given in parentheses following a melting point is the solvent used for crystallization in each case.

(A) 5-pyrazolones (1) 3-ethyl-1-methyl-5-pyrazolone.—To an ice cold solution of 10 g. of methylhydrazine in 200 ml. of methanol is added dropwise 22.5 g. of methyl 2-pentynoate. The reaction mixture is stirred at 0–10° C. for 4 hours and at 20–25° C. for 16 hours and is then evaporated under reduced pressure to give 3-ethyl-1-methyl-5-pyrazolone; M.P. 101–103° C. (benzene-petroleum ether).

(2) 1-methyl-3-propyl-5-pyrazolone, M.P. 109–111° C. (benzene-petroleum ether); obtained by the method of (1) above from the reaction of 50 g. of methylhydrazine with 126 g. of methyl 2-hexynoate.

(3) 3-isopropyl-1-methyl-5-pyrazolone, M.P. 113–115° C. (benzene-petroleum ether); obtained by the method of (1) above from the reaction of 50 g. of methylhydrazine with 126 g. of methyl 4-methyl-2-pentynoate.

(4) 3-methyl-1-propyl-5-pyrazolone, M.P. 107–109° C. (toluene-petroleum ether); obtained by the method of (1) above from the reaction of equimolar amounts of propylhydrazine and methyl 2-butynoate.

(5) 3-butyl-1-methyl-5-pyrazolone, M.P. 102–104° C. (toluene-petroleum ether); obtained by the method of (1) above from the reaction of equimolar amounts of methylhydrazine and methyl 2-heptynoate.

(6) 1-ethyl-3-methyl-5-pyrazolone, M.P. 110–112° C. (toluene-petroleum ether); obtained by the method of (1) above from the reaction of equimolar amounts of ethylhydrazine and methyl 2-butynoate.

(7) 3-ethyl-1-propyl-5-pyrazolone, M.P. 96–97° C. (toluene-petroleum ether); obtained by the method of (1) above from the reaction of equimolar amounts of propylhydrazine and methyl 2-pentynoate.

(B) 5-chloropyrazoles (1) 5-chloro-1-ethyl-3-methylpyrazole.—A mixture of 26 g. of 1-ethyl-3-methyl-5-pyrazolone and 65.0 g. of phosphorus oxychloride is stirred and heated under reflux for 16 hours and is then poured cautiously into a mixture of 200 ml. of concentrated aqueous ammonia, 200 g. of ice, and 200 ml. of ether. After about 30 minutes, the organic phase is separated, and the aqueous phase is extracted 3 times with ether. The separated organic phase and the ether extracts are combined, dried, and evaporated to give an oily residue of 5-chloro-1-ethyl-3-methylpyrazole; B.P. 55–57° C./10 mm. Hg.

(2) 5-chloro-3-ethyl-1-methylpyrazole, B.P. 82–83° C./28 mm. Hg; obtained by the method of (1) above from the reaction of 126 g. of 3-ethyl-1-methyl-5-pyrazolone with 320 g. of phosphorus oxychloride.

(3) 5-chloro-1-methyl-3-propylpyrazole, B.P. 78–79° C./10 mm. Hg; obtained by the method of (1) above from the reaction of 125 g. of 1-methyl-3-propyl-5-pyrazolone with 310 g. of phosphorus oxychloride.

(4) 5-chloro-3-isopropyl-1-methylpyrazole, B.P. 72–74° C./10 mm. Hg; obtained by the method of (1) above from the reaction of 123 g. of 3-isopropyl-1-methyl-5-pyrazolone with 320 g. of phosphorus oxychloride.

(5) 5-chloro-1,3-dimethylpyrazole, B.P. 140° C./760 mm. Hg; obtained by the method of (1) above from the reaction of 1,3-dimethyl-5-pyrazolone (for the preparation of this compound, see Chem. Berichte, vol. 41, page 555, 1908) with 2-molecular equivalents of phosphorus oxychloride.

(6) 5-chloro-3-butyl-1-methylpyrazole, B.P. 90–92° C./10 mm. Hg; obtained by the method of (1) above from the reaction of 3-butyl-1-methyl-5-pyrazolone with 2 molecular equivalents of phosphorus oxychloride.

(7) 5-chloro-3-methyl-1-propylpyrazole, B.P. 83–84° C./22 mm. Hg; obtained by the method of (1) above from the reaction of 3-methyl-1-propyl-5-pyrazolone with 2 molecular equivalents of phosphorus oxychloride.

(8) 5-chloro-3-ethyl-1-propylpyrazole, B.P. 104–105° C./30 mm. Hg; obtained by the method of (1) above from the reaction of 3-ethyl-1-propyl-5-pyrazolone with 2 molecular equivalents of phosphorus oxychloride.

(C) 4-aroyl-5-chloropyrazoles (1) 4 - benzoyl-5-chloro-1,3-dimethylpyrazole.—To a suspension of 40 g. of anhydrous alumina chloride in 200 ml. of sym-tetrachloroethane is slowly added first 39 g. of 5-chloro-1,3-dimethylpyrazole and then 46 g. of benzoyl chloride. The resulting mixture is stirred and heated under reflux for 18 hours, cooled, and poured into a mixture of ice water and concentrated hydrochloric acid. The organic phase is separated, washed with 200 ml. of 4 N aqueous sodium hydroxide, dried, and evaporated to give an oily residue of 4-benzoyl-5-chloro-1,3-dimethylpyrazole; B.P. 128–130° C./0.2 mm. Hg; M.P. 50° C.

(2) 5-chloro-4-(o-chlorobenzoyl) - 1,3 - dimethylpyrazole.—A mixture consisting of 38 g. of 5-chloro-1,3-dimethylpyrazole, 53 g. of o-chlorobenzoyl chloride, 40 g. of anhydrous aluminum chloride, and 250 ml. of sym-tetrachloroethane is stirred and heated under reflux for 18 hours, cooled, and poured into ice water. The organic phase is separated, stirred with 300 ml. of dilute aqueous sodium hydroxide for one hour, separated again, washed with water, dried, and evaporated to give 5-chloro-4-(o-chlorobenzoyl)-1,3-dimethylpyrazole; M.P. 70–72° C. (carbon tetrachloride-petroleum ether).

(3) 5-chloro-4-(o-fluorobenzoyl) - 1,3 - dimethylpyrazole, M.P. 70–72° C.; obtained by the general method described in (1) and (2) above from the reaction of 64 g. of 5-chloro-1,3-dimethylpyrazole with 90 g. of o-fluorobenzoyl chloride in the presence of 75 g. of anhydrous aluminum chloride in 300 ml. of sym-tetrachloroethane.

(4) 5-chloro-4-(o - chlorobenzoyl)-1-ethyl-3-methylpyrazole, M.P. 62–64° C. (hexane); obtained by the general method of (1) and (2) above from the reaction of 43.2 g. of 5-chloro-1-ethyl-3-methylpyrazole with 53 g. of o-chlorobenzoyl chloride and 40 g. of anhydrous aluminum chloride in 200 ml. of sym-tetrachloroethane.

(5) 5-chloro-4-(o-chlorobenzoyl) - 3 - ethyl-1-methylpyrazole, M.P. 77–79° C.; obtained from the reaction of 72 g. of 5-chloro-3-ethyl-1-methylpyrazole with 88 g. of o-chlorobenzoyl chloride and 70 g. of anhydrous aluminum chloride in 200 ml. of sym-tetrachloroethane.

(6) 5-chloro - 4 - (o-chlorobenzoyl) - 1 - methyl-3-propylpyrazole, B.P. 180–182° C./0.2 mm. Hg; obtained from the reaction of 80 g. of 5-chloro-1-methyl-3-propylpyrazole with 90 g. of o-chlorobenzoyl chloride and 70 g. of anhydrous aluminum chloride in 200 ml. of sym-tetrachloroethane.

(7) 5-chloro-4-(o-chlorobenzoyl) - 3 - isopropyl-1-methylpyrazole, B.P. 148–150° C./0.2 mm. Hg; obtained from 80 g. of 5-chloro-3-isopropyl-1-methylpyrazole, 90 g. of o-chlorobenzoyl chloride, and 70 g. of anhydrous aluminum chloride in 200 ml. of sym-tetrachloroethane.

(8) 4-(o-bromobenzoyl) - 5 - chloro - 1,3 - dimethylpyrazole, B.P. 135–137° C./0.15 mm. Hg; obtained by the general method of (1) and (2) above from the reaction of 5-chloro-1,3-dimethylpyrazole with o-bromobenzoyl chloride in the presence of aluminum chloride.

(9) 5 - chloro - 1,3 - dimethyl-4-[(o-trifluoromethyl)benzoyl]pyrazole, B.P. 105–107° C./0.15 mm. Hg; obtained from the reaction of 5-chloro-1,3-dimethylpyrazole with α,α,α-trifluoro-o-toluyl chloride in the presence of aluminum chloride.

(10) 5-chloro-1,3-dimethyl-4-[(m-trifluoromethyl)benzoyl]pyrazole, B.P. 113–115° C./0.2 mm. Hg (upon standing, the distilled forms a crystalline solid, M.P. 64–66° C.); obtained from the reaction of 5-chloro-1,3-dimethylpyrazole with α,α,α-trifluoro-m-toluyl chloride in the presence of aluminum chloride.

(11) 5-chloro-1,3-dimethyl-4-(o-toluyl)pyrazole, B.P. 105–106° C./0.15 mm. Hg; obtained from the reaction of 5-chloro-1,3-dimethylpyrazole with o-toluyl chloride in the presence of aluminum chloride.

(12) 3-butyl-5-chloro-4-(o-chlorobenzoyl) - 1 - methylpyrazole, B.P. 188–190° C./0.2 mm. Hg; obtained from the reaction of 3-butyl-5-chloro-1-methylpyrazole with o-chlorobenzoyl chloride in the presence of aluminum chloride.

(13) 5-chloro - 3 - methyl-1-propyl-4-[(o-trifluoromethyl)benzoyl]pyrazole, B.P. 123–125° C./0.2 mm Hg; obtained from the reaction of 5-chloro-3-methyl1-propylpyrazole with α,α,α-trifluoro-o-toluyl chloride in the presence of aluminum chloride.

(14) 5-chloro - 4 - (o-chlorobenzoyl)-3-ethyl-1-propylpyrazole, B.P. 138–140° C./0.15 mm. Hg; obtained from the reaction of 5-chloro-3-ethyl-1-propylpyrazole with o-chlorobenzoyl chloride in the presence of aluminum chloride.

(15) 5-chloro-4-(o-methoxybenzoyl) - 3-methyl-1-propylpyrazole. To a stirred solution of 24 g. of 4-bromo-5-chloro-3-methyl-1-propylpyrazole in 400 ml. of anhydrous ether, cooled to 0° C. and kept in a nitrogen atmosphere, is added dropwise 60 ml. of 1.67 M solution of n-butyl lithium in heptane. The resulting mixture is stirred for 15 minutes and is then added to a solution of 34.0 g. of o-methoxybenzoyl chloride in 800 ml. of anhydrous ether at −70° C. The reaction mixture is allowed to warm to room temperature while stirring is continued, 200 ml. of methanol is added, and the methanolic mixture is stirred at room temperature for 16 hours. To this mixture is then added 500 ml. of 0.4 N aqueous sodium hydroxide, and the organic phase is separated, dried, and evaporated under reduced pressure to give 5-chloro-4-(o-methoxybenzoyl)-3-methyl - 1 - propylpyrazole; B.P. 153–155° C./0.2 mm. Hg.

(16) 5-chloro-4-(o-methoxybenzoyl) - 1,3 - dimethylpyrazole, B.P. 131–133° C./0.15 mm. Hg (upon standing, the distillate forms a crystalline solid, M.P. 76–78° C.); obtained by the method of (15) above from the initial reaction of 4-bromo-5-chloro-1,3-dimethylpyrazole with n-butyl lithium, and the subsequent reaction of the lithiated intermediate with o-methoxybenzoyl chloride.

(17) 5-chloro-4-(2 - chloro - 3 - methoxybenzoyl)-1,3-dimethylpyrazole, M.P. 108–109° C. (ether); obtained by the method of (15) above from the initial reaction of 4-bromo-5-chloro - 1,3 - dimethylpyrazole with n-butyl lithium, and the subsequent reaction of the lithiated intermediate with 2-chloro-3-methoxybenzoyl chloride.

(18) 5-chloro - 4 - (cyclohexanecarbonyl) - 1 - ethyl-3-methylpyrazole, B.P. 110–111° C./0.15 mm. Hg; obtained by the method of (15) above from the initial reaction of 4-bromo-5-chloro-1-ethyl-3-methylpyrazole with n-butyl lithium, and the subsequent reaction of the lithiated intermediate with cyclohexanecarbonyl chloride.

(19) 5-chloro-1,3-dimethyl - 4 - (2 - thenoyl)pyrazole, B.P. 120–120.5° C./0.15 mm. Hg (upon standing, the distillate forms a crystalline solid, M.P. 97–99° C.); obtained by the method of (15) above from the initial reatction of 4-bromo-5-chloro-1,3-dimethylpyrazole with n-butyl lithium, and the subsequent reaction of the lithiated intermediate with 2-thenoyl chloride.

(20) 5-chloro-4-(2 - chloro-3-methoxybenzoyl)-3-methyl-1-propylpyrazole, B.P. 175–177° C./0.15 mm. Hg; obtained by the method of (15) above from the initial reaction of 4-bromo-5-chloro-3-methyl-1-propylpyrazole with n-butyl lithium, and the subsequent reaction of the lithiated intermediate with 2-chloro-3-methoxybenzoyl chloride.

(D) 4-bromo-5-chloropyrazoles (1) 4-bromo-5-chloro-3-methyl-1-propylpyrazole.—To a warm, stirred solution of 80 g. of 5-chloro-3-methyl-1-propylpyrazole in 500 ml. of glacial acetic acid is slowly added 82 g. of bromine, and the resulting mixture is heated under reflux for 15 minutes and evaporated under reduced pressure. The residue is partitioned between excess saturated aqueous sodium bicarbonate and chloroform, and the organic phase is separated, dried, and evaporated under reduced pressure to give 4-bromo-5-chloro-3-methyl-1-propylpyrazole; B.P. 93–95° C./6 mm. Hg.

(2) 4-bromo-5-chloro - 1 - ethyl-3-methylpyrazole, B.P. 93–94° C./10 mm. Hg; obtained by the method of (1) above from the reaction of equimolar amounts of 5-chloro-1-ethyl-3-methylpyrazole and bromine.

(3) 4-bromo-5-chloro-1,3-dimethylpyrazole, B.P. 84–87° C./10 mm. Hg; obtained by the method of (1) above from reaction of equimolar amounts of 5-chloro-1,3-dimethylpyrazole and bromine.

(E) 5-aminopyrazoles (1) 5-amino-3-ethyl-1-methylpyrazole.—To a mixture consisting of 22 g. of 3-oxovaleronitrile, 30 ml. of water, and 8 ml. of concentrated hydrochloric acid is added a solution of 10 g. of methylhydrazine in 100 ml. of water and 20 ml. of concentrated hydrochloric acid, and the resulting mixture is stirred at 35–40° C. for one hour. The mixture is then heated to 90° C., 15 ml. more of concentrated hydrochloric acid is added, and the mixture is kept at room temperature for 16 hours. It is next evaporated under reduced pressure, and the residue is made strongly alkaline with 50% aqueous sodium hydroxide. The alkaline mixture is extracted with dichloromethane, and the extract is dried and evaporated under reduced pressure to give 5-amino-3-ethyl-1-methylpyrazole; M.P. 65° C.

(2) 5-amino-3-methyl-1-propylpyrazole (monohydrochloride, M.P. 158–160° C., following crystallization from 2-propanol-ether); obtained by the method of (1) above from the reaction of equimolar amounts of 3-oxobutyronitrile and propylhydrazine in excess hydrochloric acid.

(3) 5-amino-1-isopropyl-3-methylpyrazole, M.P. 108–110° C.; obtained by the method of (1) above from the reaction of equimolar amounts of 3-oxobutyronitrile and isopropylhydrazine in excess hydrochloric acid.

(4) 5-amino-1-butyl-3-methylpyrazole (monohydrochloride, M.P. 177–179° C., following crystallization from 2-propanolether); obtained by the method of (1) above from the reaction of equimolar amounts of 3-oxobutyronitrile and butylhydrazine in excess hydrochloric acid.

We claim:
1. A member of the class consisting of 5-amino-4-aroyl-pyrazole compounds having the formula

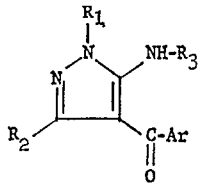

and pharmaceutically-acceptable salts thereof; where each of $R_1$ and $R_2$ is alkyl of not more than 4 carbon atoms, $R_3$ is hydrogen or methyl, and Ar is a member of the class consisting of phenyl, fluorophenyl, chlorophenyl, bromophenyl, trifluoromethylphenyl, methoxyphenyl, tolyl, 2-chloro-3-methoxyphenyl, cyclohexyl, and 2-thienyl.

2. A compound according to claim 1 which is 5-amino-4-(o-chlorobenzoyl)-1-ethyl-3 - methylpyrazole monohydrochloride.

3. A compound according to claim 1 which is 4-(o-fluorobenzoyl)-1,3-dimethyl - 5 - (methylamino)pyrazole monohydrochloride.

4. A compound according to claim 1 which is 5-amino-4-(o-chlorobenzoyl)-3-methyl-1-propylpyrazole.

5. A compound according to claim 1 which is 5-amino-4-(o-bromobenzoyl)-3-methyl-1 - pyropylpyrazole monohydrobromide.

6. A compound according to claim 1 which is 5-amino-4-(2-chloro-3-methoxybenzoyl)-3 - methyl - 1 - propylpyrazole.

References Cited

Michaelis et al., Berichte, vol. 36, pp. 523–30 (1903). QD1.D4.

Michaelis et al., Berichte, vol. 50 pp. 737–53 (1917). QD1.D4.

Michaelis et al., J. Chem. Soc. (London), vol. 112, Abstracts, Part I, pp. 480–1 (1917). QD1.C6.

Grandberg et al., Chem. Abst., vol. 54, columns 22583–4 (1960). QD1.A51.

Fusco et al., Chem. Abst. vol. 43, columns 4257–8 (1949). QD1.A51.

NATALIE TROUSOF, Primary Examiner

U.S. Cl. X.R.

260—239.3D, 310A, 311, 999; 424—273